United States Patent [19]

Whinfrey

[11] 4,300,738
[45] Nov. 17, 1981

[54] DUCT SUPPORT STRUCTURE

[75] Inventor: Thomas B. Whinfrey, Media, Pa.

[73] Assignee: The Boeing Company, Seattle, Wash.

[21] Appl. No.: 178,879

[22] Filed: Aug. 18, 1980

[51] Int. Cl.³ .......................... E21F 17/02; F16L 3/00
[52] U.S. Cl. .................................... 248/62; 248/74 A
[58] Field of Search ....................... 248/58, 59, 60, 62, 248/74 A, 316 D, 68 CB; 24/257; 138/107

[56] References Cited

U.S. PATENT DOCUMENTS

| | | | |
|---|---|---|---|
| 370,386 | 9/1887 | Gholson | 248/49 UX |
| 2,229,129 | 1/1941 | Riegelman | 248/62 |
| 3,095,908 | 7/1963 | Plummer | 138/107 |
| 3,576,304 | 4/1971 | Gillemot | 248/74 A |
| 3,888,439 | 6/1975 | Tuttle | 248/74 A X |

FOREIGN PATENT DOCUMENTS 1204890 11/1965 Fed. Rep. of Germany .... 24/257 R
1272412 7/1968 Fed. Rep. of Germany ... 248/74 A Primary Examiner—J. Franklin Foss
Attorney, Agent, or Firm—Robert S. Lipton; Jack D. Puffer

[57] ABSTRACT

A support structure for thin wall, lightweight, ducts which are commonly used in aircraft is disclosed. The support structure, a clamp, has a split, circular body with a tapered separation. A support bracket is connected to the body of the clamp which permits mounting to a bulkhead. The split circular body of the clamp is designed in a manner which allows for quick mounting and dismounting the duct without the use of tools. The split line is at an angle with respect to the longitudinal axis of the clamp. The clamp will grip the duct tight enough to prevent movement between the duct and the support without damaging the duct.

3 Claims, 4 Drawing Figures

DUCT SUPPORT STRUCTURE

BACKGROUND OF THE INVENTION

1. Field of the Invention

This invention relates generally to improvements in devices used in the field of duct supports. In particular, the invention relates to devices used in distributing and routing lightweight ducts such as those used in aircraft.

2. Description of the Prior Art

Support clamp devices are well known in the prior art. One of the simplest devices for this purpose is a simple ring integrated with a bracket to fasten it to a bulkhead. Devices of this type are used to support and route wire harnesses and fluid ducts in buildings and vehicles. In attempts to allow for reduced assembly time, several devices employ means which allow a clamp ring to open.

A split ring clamp is disclosed in U.S. Pat. No. 3,960,232 issued to Hubbell on June 1, 1976. Here, the ring clamp consists of two resilient jaws comprised of heavy gauge metal. The two jaws do not form a completely closed ring. This design allows a rigid pipe or conduit to be quickly inserted or removed.

A heat shrinkable split ring clamp also is disclosed in U.S. Pat. No. 3,483,285 issued to Foley on Jan. 6, 1967. A split ring clamp is disclosed with a two piece ring. The ring clamps around a cable or duct after it is placed within the ring and external heat is applied to cause shrinkage of the clamp.

A split ring safety clamp is also taught in U.S. Pat. No. 3,954,383 issued to Nivet on May 4, 1976. This patent teaches a two piece clamp design which requires the application of a force to lock the clamp ring securely around the cable or duct to be held.

There have been various problems associated with the split ring clamp devices of the prior art, particularly for use in aircraft. It is desirable to have a clamp device that will hold a thin wall, lightweight, composite duct in an aircraft. An ideal support clamp should grip a duct tight enough to prevent movement between the duct and the support, but not tight enough to collapse the duct. Also, it is advantageous to have the clamp be lightweight, easy to install and durable.

SUMMARY OF THE INVENTION

The device of the present invention includes a split ring clamp having a circular body. The circular body has a tapered division at a point opposite the support bracket. The support bracket and split ring body, are integrated into a one piece unit. The support bracket permits mounting of the split ring clamp to a bulkhead such as found in an aircraft. The device allows rapid installation or removal of a lightweight, thin walled duct without use of tools or removal of any hardware.

The split ring clamp body holds a duct securely without causing it to collapse. The ring clamp body permits the insertion and removal of a duct quickly by application of a twisting force and motion on the tapered division. The twisting motion causes the ring body to separate sufficiently to allow easy insertion of a thin wall duct without damage to the duct. After insertion or removal of the duct, the tapered division of the ring clamp body returns to its normal shape. In the case in which a duct was being inserted into the clamp, the duct will now be securely held until it is desired to remove it for servicing.

It is the object of this invention to provide a split ring clamp support for thin walled, lightweight ducts commonly found in aircraft.

It is further the object of this invention to provide a split ring clamp support for lightweight ducts which requires no tools or disassembly to facilitate installation or removal of the duct from the support.

Another object of this invention is to provide a split ring clamp support for wire harnesses in aircraft which can be quickly removed from the support.

A further object of the present invention is to provide a split ring clamp support for a lightweight duct which is lightweight, inexpensive compared to existing supports, is easily maintainable and does not require removal when the duct is replaced.

Other objects and advantages of the invention will become apparent upon reading the following detailed description and upon reference to the drawings in which:

BRIEF DESCRIPTION OF THE DRAWINGS

The invention will now be described in detail with reference to the drawings wherein like numbers refer to like parts.

DETAILED DESCRIPTION OF THE PREFERRED EMBODIMENT

Figure 1:
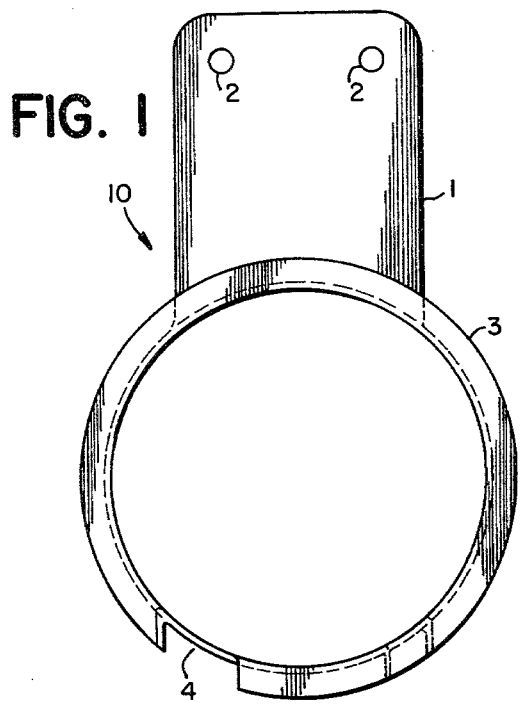
FIG. 1 is a side view of the present invention showing the ring clamp and mounting flange.
Figure 2:
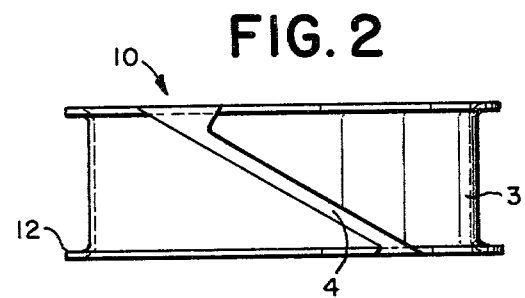
FIG. 2 is a bottom view of the present invention showing the portion of the clamp containing the tapered partition.
Figure 3:
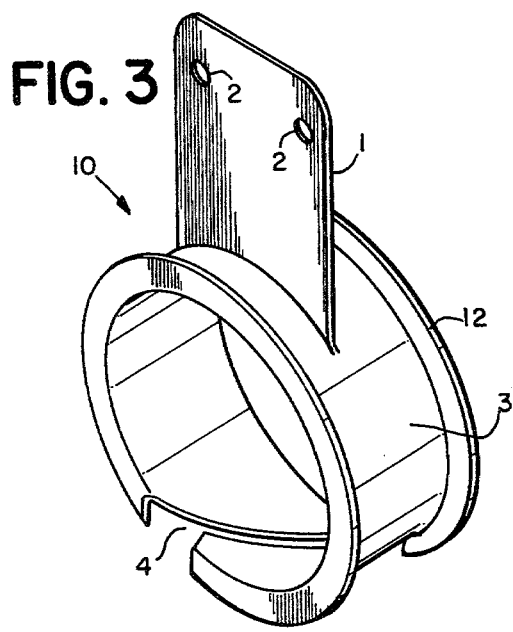
FIG. 3 is a perspective view of the present invention illustrating the ring clamp with the integral support flange.
Figure 4:
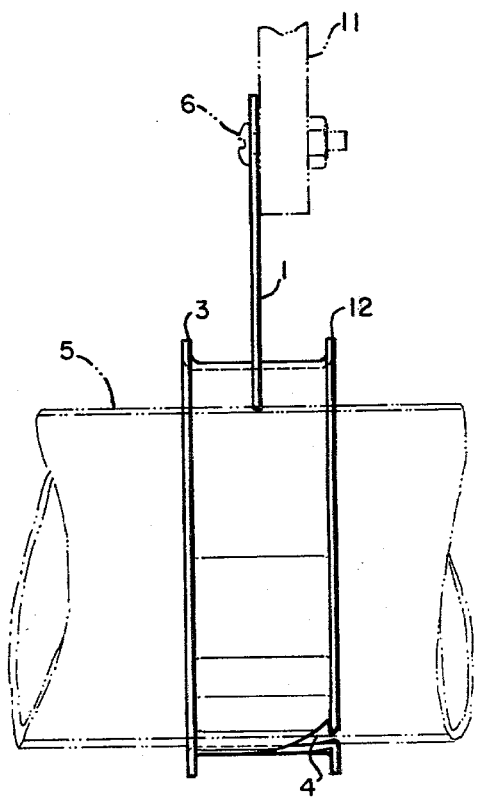
FIG. 4 is a side profile view of the present invention illustrating the ring clamp in use supporting a duct and further illustrating the method of support of the ring clamp.

Referring now to FIG. 1 there is shown a side view of the split ring clamp 10 of the present invention. Clamp 10 is made of two main components, the ring portion 3 and the bracket 1. As shown, the bracket 1 contains mounting holes 2 which facilitate fastening the clamp 10 to a wall or bulkhead 11 as shown in FIG. 4. A fastening device 6, shown as a nut and bolt, is placed through the hole 2 fastening clamp 10 at an appropriate location on the bulkhead 11. Ring body 3 is divided into two parts as shown in the perspective view of FIG. 3. The portion of the ring opposite the position of bracket 1 contains a separation or gap 4 dividing the ring body 3 into two major parts. The purpose of separation 4 is to facilitate the placement and removal of a lightweight, thin wall, composite duct 5 as shown in FIG. 4. The duct 5 may be placed within, or removed from, the ring portion 3 of the clamp 10 without the need of any tools or removal of any hardware.

Insertion of duct 5 into ring 10 is accomplished by applying a twisting force to the tapered ends of the ring 3 or the separation 4. This force causes the tapered ends to separate sufficiently to allow duct 5 to pass into the ring body 3 without undue restriction or collapsing of the duct. When the duct 5 is in position within the ring body 3, the tapered ends of the ring are released, permitting them to move to their normal position thus, causing the ring body to securely hold the duct. The design of the taper shown at separation 4 and the thickness of the ring body 3 is such so as to prevent duct 5 from collapsing during its insertion into clamp 10. The tapered members forming separation 4 are designed to yield to a force which is of a level such to prevent the duct 5 from being ejected under forces generated by vibration or loads encountered in aircraft.

In a similar fashion, the removal of duct 5 for servicing is accomplished by applying pressure on the tapered ends of separation 4 which causes ring body 3 to expand allowing duct 5 to be removed. The ring body 3 is designed with flanges 12 on both sides, as illustrated, to increase its resilience and therefore its ability to hold the duct securely in place even when stresses are placed on duct 5. The angle formed by the separation 4 with respect to the edge of the ring body 3 in the preferred embodiment is between 30 degrees and 45 degrees with respect to a plane parallel to the ring face. This range has shown to be most effective in providing the resiliency required by ring body 3 to securely hold duct 5 in place.

The preferred embodiment is designed to be utilized with lightweight ducts in aircraft. Aircraft usually encounter vibration and G forces not normally found in other applications. Therefore, the resiliency of the ring body must be such as to prevent the duct being contained from being ejected due to such loads.

The material from which the clamp 10 is constructed must be carefully selected. The material must possess an appropriate degree of flexibility and have a spring constant such that ring body 3 will have the proper flexibility. In order to maintain its spring constant, the material must have a low coefficient of expansion and resist cracks through a large range of temperatures normally encountered in vehicles, particularly aircraft. The material used in the preferred embodiment is a tough nylon that has exceptional resistance to crack initiation, crack propagation, chemical solvents and heat. The present invention is designed using Nylon Zytel manufactured by DuPont. Also, polyethersulfone, used to manufacture ducts in aircraft, may be used to manufacture the support structure.

While the split ring clamp of the present invention has been illustrated and disclosed with reference to a preferred embodiment, it is to be understood that various changes and modifications may be made within the scope and spirit of the invention.

What is claimed is:

1. A support for a thin wall, composite duct comprising: a circular clamp ring formed in the shape of a tube having the ends of said tube disposed radially outward about the circumference of said tube, said ring having first and second members positioned so that they are opposed with respect to each other along an interface line, said interface line being at an angle between 30 and 45 degrees with respect to the perimeter of said ring body, said first and second members each being tapered and having a pointed end, said first and second members constituting laterally resilient jaws to retain the lightweight composite duct without use of other fastening devices, said first and second members having a thickness which allows insertion of a thin walled duct by compression of the duct against said first and second members, said first and second members enclosing about said duct to provide support therefor; and a plate-like mounting bracket integrally formed with said ring, said bracket being positioned on the outer surface of said tube so that it is located opposite the midpoint of said interface line and so that the plane of said bracket is perpendicular to the axis of said tube.

2. The invention as in claim 1 wherein said duct and said support structure are manufactured from Nylon Zytel.

3. The invention as in claim 1 wherein said duct and said support structure are manufactured from polyethersulfone.

* * * * *